(No Model.)
J. BUCHHOLZ.
CHEESE KNIFE.
No. 352,441. Patented Nov. 9, 1886.
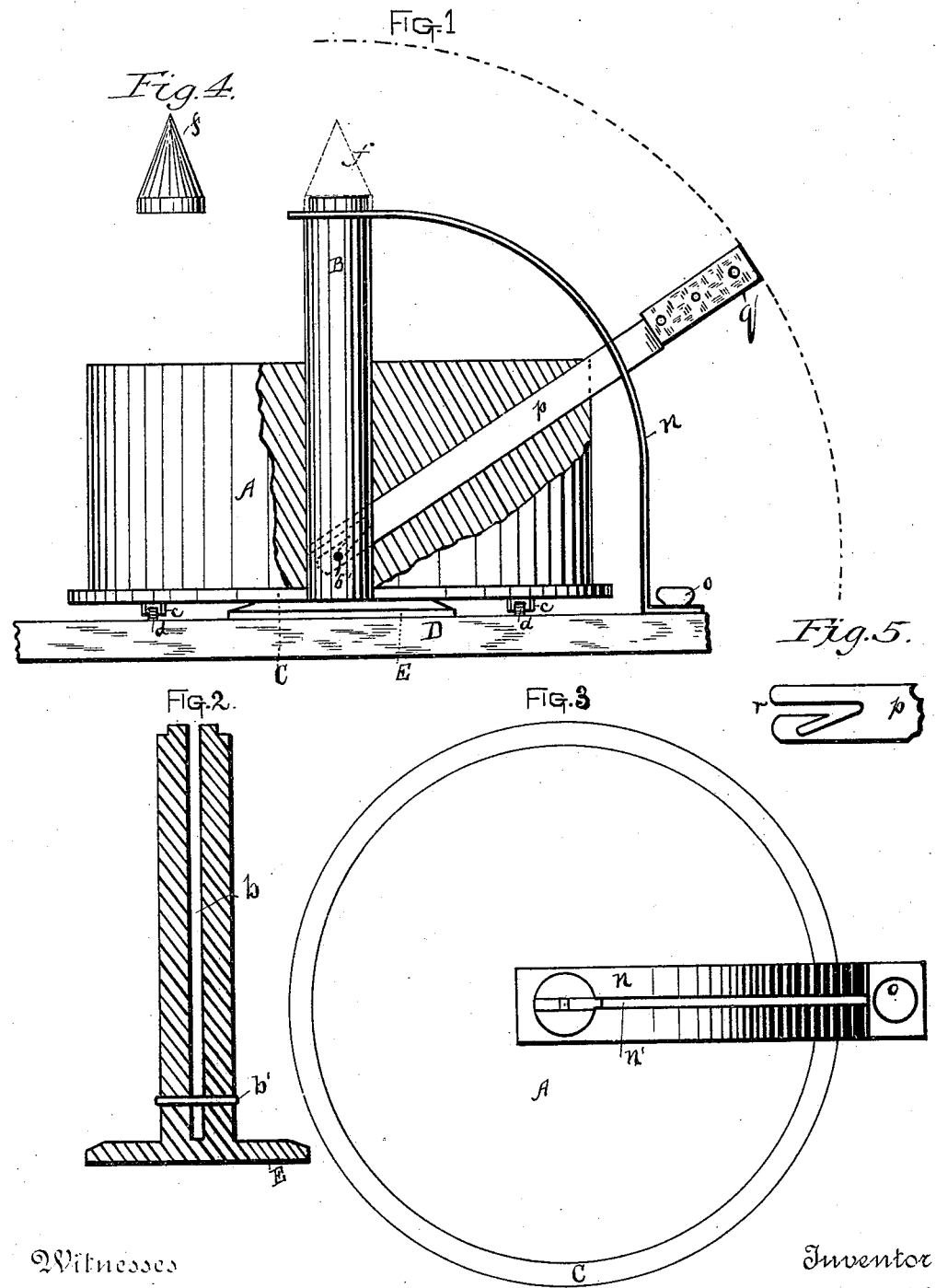
Witnesses
A. A. Caylor
Wm Galer.
Inventor
John Buchholz
By his Attorney
C. C. Shepherd.

UNITED STATES PATENT OFFICE.

JOHN BUCHHOLZ, OF GROVE CITY, OHIO.

CHEESE-KNIFE.

SPECIFICATION forming part of Letters Patent No. 352,441, dated November 9, 1886.

Application filed March 15, 1886. Serial No. 195,276. (No model.)

*To all whom it may concern:*

Be it known that I, JOHN BUCHHOLZ, a citizen of the United States, residing at Grove City, in the county of Franklin and State of Ohio, have invented a new and useful Improvement in Cheese-Knives, of which the following is a specification.

My invention relates to improvements in cheese-cutting devices, wherein a slotted stem or sheath having a knife-blade pivoted therein is used; and the objects of my improvements are, first, to secure permanently the stem or sheath to the bottom of the cheese-box; second, to so pivot the knife-blade within the stem as to admit of its being readily detached therefrom; third, to so construct the knife-guide as to form a bearing for both sides of the blade. These objects I accomplish in the manner illustrated in the accompanying drawings, in which—

Figure 1 is a side elevation of a cheese, partly in section, placed on its revolving plate, showing the knife stem or sheath therethrough and the knife in the act of cutting. Fig. 2 is a vertical section of the base and stem of the device. Fig. 3 is a plan view of the device. Fig. 4 represents the stem-cap, and Fig. 5 is a view of the end of the knife-blade $p$.

Similar letters refer to similar parts throughout the several views.

D represents the bottom of the cheese-box, to the center of which is secured the enlarged base of the stem B. The latter, projecting upwardly, is provided, in the usual manner, with a central vertical slot, $b$, open at its upper end. The top of the stem is cut away to form a circular shoulder thereon. Loosely pivoted on the stem B, and resting on the upper side of the base E, is a circular plate or disk, C, which is provided on its under side, at desirable points, with downwardly-projecting bearings $e$, in each of which is pivoted a caster-wheel, $d$, made to rest on the top side of the box-bottom D. Made to pass through the stem, transversely through the slot $b$, near its lower end, is a pin, $b'$. In order to more easily press the center of the cheese down over the stem B, I provide a detachable metal cone-shaped cap or point, $f$, the base of which is adapted to fit on the upper end of the stem B, thus providing the stem with a temporarily-pointed top, which may readily be pushed through the center of the cheese, and at the same time prevents the particles of cheese entering and clogging the slot $b$.

The cheese A having been placed on the circular plate C, by pushing the stem through its center, the cap $f$ may be removed and the upper perforated end of a thin metal strip, $n$, fitted over the upper end of the stem and allowed to rest on the circular shoulder thereon. This metal strip $n$, which serves as a knife-guide, is formed with a central slot, $n'$, closed at its lower end and opening into the perforation in its upper end opposite the slot $b$ in the stem, and extends outward and downward over one-half of the cheese to the top of the bottom of the cheese-box, where it is bent outward, its bent portion being provided with a small slot or perforation, through which passes a screw, $o$, which is adapted to enter the bottom of the cheese-box D. A knife-blade, $p$, having a handle, $q$, and provided in its lower end with a slot, $r$, consisting of a short vertical cut from the end of the knife-blade upward, from this point a second cut or arm of the slot being made obliquely downward to within a short distance of the end of the blade, is then inserted vertically into the slot $b$ of the stem, its open slotted end slipping down over the pin $b'$ until the pin rests in the obliquely-cut arm of the slot. The knife-blade $p$ and its guide $n$ having thus been attached to the stem B, the knife-blade may be easily forced outward and downward through the cheese at any desired point, its sides bearing in the slotted guide-strip $n$. The plate C may be revolved on its caster-wheels around the stem until the cheese is in the desired position.

In case it is desired to place a new cheese on the plate, the knife may be withdrawn from the stem, the screw $o$ may be loosened, the upper end of the guide-strip $n$ raised off its position on the stem and turned around out of the way, and the cone-shaped cap $f$ adjusted, as described.

I am aware that a slotted stem having a slotted knife-blade therein has been used, and that a knife-guide adapted to form a rest for one side of the knife has been used, and I do not claim, broadly, this construction.

What I claim, and desire to secure by Letters Patent, is—

The combination of the slotted stem B, fixed to the bottom of the cheese-box, with a knife-blade pivoted therein by means of a pivot-pin, $b'$, passing through an open slot, $r$, in the end of said knife-blade, the slotted knife-guide strip $n$, having its upper end fitted over the top of the stem and its lower end detachably secured to the bottom of the cheese-box, and the detachable conical cap $f$, substantially as and for the purpose specified.

JOHN BUCHHOLZ.

Witnesses:
  M. C. GALER,
  A. A. CAYLOR.